United States Patent [19]

Cook et al.

[11] 4,221,696

[45] Sep. 9, 1980

[54] HEAT RESISTANT HOT-MELT SEALANT AND CAULKING COMPOUND

[75] Inventors: Mary J. Cook; Kenneth W. Hyche, both of Kingsport, Tenn.

[73] Assignee: Eastman Kodak Company, Rochester, N.Y.

[21] Appl. No.: 64,446

[22] Filed: Aug. 6, 1979

[51] Int. Cl.$^2$ .................. C08K 3/26; C08L 23/26
[52] U.S. Cl. .................. 260/42.46; 156/334; 525/240
[58] Field of Search .................. 260/42.46; 525/240

[56] References Cited

U.S. PATENT DOCUMENTS

| | | | |
|---|---|---|---|
| 3,137,672 | 6/1964 | Lehane | 260/42.46 |
| 3,372,049 | 3/1968 | Schaffhausen | 525/240 |
| 3,560,420 | 2/1971 | Tamura | 260/42.46 |
| 3,634,546 | 1/1972 | Hagemeyer et al. | 525/240 |
| 3,679,775 | 7/1972 | Hagemeyer et al. | 525/268 |
| 3,817,904 | 6/1974 | Gagle et al. | 260/42.46 |
| 3,900,694 | 8/1975 | Jurrens | 525/240 |
| 4,127,619 | 11/1978 | Godfrey | 525/240 |
| 4,165,302 | 8/1979 | Armenti et al. | 260/42.46 |

*Primary Examiner*—Walter C. Danison
*Attorney, Agent, or Firm*—Clyde L. Tootle; Daniel B. Reece III

[57] ABSTRACT

The hot-melt sealant of the present invention comprises a blend of at least one modified polyethylene resin, at least one filler, a thixotropic additive, and an amorphous polypropylene. This hot-melt sealant and caulking compound has a novel combination of properties including excellent aging properties in combination with corrosion resistance, low viscosity, and elevated temperature resistance properties.

8 Claims, No Drawings

HEAT RESISTANT HOT-MELT SEALANT AND CAULKING COMPOUND

This invention relates to hot-melt sealants and caulking compounds containing modified polyethylene, amorphous polypropylene and fillers. One aspect of this invention concerns a filled hot-melt sealant or caulking compound containing modified polyethylene having a novel combination of properties. Another aspect of this invention concerns a filled heat resistant hot-melt sealant or caulking compound containing modified polyethylene that will flow at elevated temperatures under normal mixing and shear or application pressures but will be resistant to flow at elevated temperatures under zero shear and atmospheric pressure. The filled hot-melt sealants and caulking compounds are heat and corrosion resistant compositions.

These thermoplastic or hot-melt compositions for caulk and sealant applications are specifically useful in the automotive industry. At the present time, most of the heat resistant sealants used in the automotive industry are solvent based compositions. The sealant is applied and solvent is flashed off during subsequent paint drying or other high temperature operations. This loss of solvent can be quite expensive; it may violate new environmental regulations, and it can be potentially hazardous. The hot-melt sealant compositions of this invention can be blended, pumped, and applied without solvents at elevated temperatures (350°–400° F.) using conventional hot melt equipment. After application, the compositions because of their highly thixotropic characteristics will not flow or sag at temperatures as high as 400° F. This means that such compositions can be applied to vertical as well as horizontal seams, weld joints, and the like and then go through a paint drying cycle without sagging or flowing.

It is, therefore, an object of the present invention to provide a novel filled hot-melt sealant or caulking composition.

Another object of this invention is to provide a filled hot-melt sealant or caulking composition having improved heat and corrosion resistance.

A further object of the present invention is to provide a filled hot-melt sealant and caulking composition that is resistant to flow at elevated temperature under zero shear and atmospheric pressure.

Another and further object of this invention is to provide a filled hot-melt adhesive having good adhesion properties which can be applied without the use of a solvent.

In accordance with the present invention we have found that a blend comprising at least one modified polyethylene resin, at least one filler, a thixotropic additive, and an amorphous polyolefin provides a hot-melt sealant or caulking composition which can be applied without solvents and has a novel combination of properties including resistance to flow at zero shear and elevated temperatures and is corrosion and heat resistant.

The modified polyethylene has a saponification member of about 3 to 10, preferably 3–5, and is prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends of modified polyethylene and blends of more than one unmodified polyethylene can also be used.

The fillers suitable in this invention are, for example, finely divided fumed silica, calcium carbonate, $TiO_2$, graphite, diatomite, talc, clays, metal oxides, and the like. Such fillers have a particle size not greater than 20 microns, preferably 5 to 10 microns.

The amorphous polyolefin useful in this invention is an essentially noncrystalline hexane soluble polyolefin, such as amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid amorphous polypropylene has a viscosity of about 1,000 to about 50,000 centipoise at 190° C. (ASTM D-1519), and preferably from about 1,500 to about 15,000 centipoise. The amorphous polyolefin can contain crystalline, hexane insoluble polyolefin up to an amount of about 30 weight percent. One such commercially available amorphous polyolefin useful in the present adhesives is the Eastobond M-5 type polyolefins available from Eastman Chemical Products, Inc. The amorphous polyolefin component is contained in the adhesive compositions of this invention in an amount of about 60 percent to about 94 percent by weight and preferably about 76 percent to about 90 percent by weight. The amorphous polyolefin component can also be an amorphous, hexane soluble propylene-alpha-monoolefin copolymer. These amorphous copolymers are formed in varying amounts during the production of crystalline propylene-alpha-monoolefin copolymers by stereospecific polymerization of propylene and a different alpha-monoolefin by a process as disclosed in U.S. Pat. No. 3,529,037, incorporated herein by reference. These amorphous copolymers can also contain various amounts of hexane insoluble polymer up to an amount of about 30 weight percent. These amorphous polymers can also be produced directly, i.e., without production of crystalline copolymer by polymerizing a mixture of propylene and butene-1 or propylene and 1-hexene in mineral spirits at a temperature of about 100° C. to about 180° C. and a pressure in the range of about atmospheric to about 2,000 psig, with the catalyst containing an organopolylithium aluminum compound and the HA or AA forms of titanium trichloride in a mole ratio of 0.01–0.05/0.1–1.0/1 by a polymerization process as disclosed in U.S. Pat. No. 3,679,775 which disclosure is incorporated herein by reference. Methods of preparation of the organopolylithium aluminum compounds are also disclosed in U.S. Pat. No. 3,679,775. One example of amorphous copolymers useful in the present invention is amorphous propylene-butene copolymers containing from about 30 percent to about 75 weight percent of butene-1, and having a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78° to 120° C., and a differential scanning calorimeter melting point no greater than 120° C. The amorphous polyolefin can be unmodified or amorphous polyolefin reacted with maleic anhydride or acrylic acid, for example, and could be degraded to the desired melt viscosity if one starts with a high molecular weight polymer.

The amorphous polyolefin can be used in amounts of about 15 percent to about 35 percent by weight of the sealant composition, preferably about 20 to 25 percent by weight, most preferably 20 percent by weight. The modified polyethylene or a blend of such modified polyethylenes can be used in amounts of 3 to 12 percent by weight in the adhesive formulation, preferably 5 to 10 percent by weight, most preferably 7.5 percent by weight. The filler can be used in an amount of 45 to 70 percent by weight, preferably 60 to 70 percent by weight, most preferably 65 percent by weight and can be one or a combination of more than one filler.

In addition, the sealant composition may also contain corrosion inhibiting compounds. The thixotropic additive is used in an amount of 1 to 4 percent by weight, preferably 1 to 2 percent. The corrosion inhibiting compounds suitable for this invention are metal sulfonates, including magnesium, barium, or calcium sulfonates dispersed in a petroleum jelly or wax base. The thixotropic additive is a silica such as fumed silica with an average particle size of 70 to 500 angstroms, sintered together in chain like formations. It is produced by the hydrolysis of silicone tetrachloride at 1100° C. resulting in a surface area varying from 40 to 500 square meters per gram. Fumed silica can be used in amounts of 1 to 4% by weight, preferably 1 to 2%. The corrosion inhibitor can be used in amounts of 0 to 15% by weight depending upon the degree of corrosion expected in the application.

The sealant and caulking compositions of the present invention have a particular unique combination of properties including good flow characteristics under mixing and application conditions, good adhesion to various metals, good corrosion resistance, and resistance to flow or sagging at elevated temperatures after application. The components of the sealant within the above ranges provide caulking and sealant compositions which have the desired properties. If the amounts of the components are modified from these ranges, the desirable combination of properties of the sealant and caulking composition are effected. The amorphous polypropylene serves as the primary binder and film former for the compositions. The modified polyethylene provides much lower viscosities and improved flow properties in highly filled systems than the unmodified polyolefins. The corrosion inhibitor provides good wetting properties in addition to corrosion resistance. The fillers provide elevated temperature resistance and lower blend cost. The fumed silica contributes non-flow or sag resistance after the composition is in place even at temperatures of 400° F. which is much above the melting point of the thermoplastic components. The examples in the attached table illustrate the compositions suitable for this invention.

The sealant and caulking compositions of this invention are prepared by blending together the components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles Dissolver provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the sealant and caulking compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)propionate]methane (Irganox 1010), lauryl stearyl thiodipropionate (Plastanox 1212), dilauryl 3,3'-thiodipropionate (Plastanox DLTDP sold by American Cyanamid) and 2,6-di-tert-butyl-p-cresol (BHT) and the like.

Additives such as nucleating agents, pigments, colorants, UV inhibitors, solvents, and the like can also be added to the sealant and caulking compositions of the present invention.

The sealant and caulking compositions of this invention, which are essentially 100 percent solids, have a melt viscosity in the range of 2,000 to 10,000 centipoise at 350° F., preferably 2,000 to 7,000 centipoise, most preferably 5,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 5 weight percent of low-molecular weight modified polyethylene (17,895 g.) having a saponification number of 5, a melt viscosity of 10,000 cp. at 150° C., density of 0.906 g./cc., and ring and ball softening point of 105° C. about 63.5 weight percent of $CaCO_3$ (4500 g.); about 25 weight percent of amorphous polypropylene having a melt viscosity of about 1000 cp. at 190° C., and ring and ball softening point of 106° C.; 1.5 weight percent fumed silica (CAB-O-Sil M-5) and 5 weight percent of a petroleum wax sulfonate blend corrosion inhibitor (sold by Whitco Chemical Company as SACI 2004) are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 350° F. of 2,550 centipoise. Caulks made with this composition exhibit excellent flow properties during application and excellent resistance to sag and run-off even at 400° F. for 10 minutes.

EXAMPLE 2

Sealant compositions were prepared using the components of Example 1 in various percentages and the hot melt sealant properties were determined for these compositions. The composition and properties of these sealants are shown in Table I.

TABLE I

| Modified Polyethylene, | $CaCO_3$ | Amorphous Polypropylene | Fumed Silica | Corrosion Inhibitor |
| --- | --- | --- | --- | --- |

TABLE I-continued

| Sealant | % | % | % | % | % |
|---|---|---|---|---|---|
| Run 1 | 5 | 63.5 | 25 | 1.5 | 5 |
| Run 2 | 5 | 63.5 | 20 | 1.5 | 10 |
| Run 3 |   | 63.5 | 25 | 1.5 | 10 |
| Run 4 |   | 63.5 | 20 | 1.5 | 15 |
| Run 5 | 10 | 63.5 | 18 | 1.5 | 7 |
| Run 6 | 0 | 63.5 | 19.5 | 0 | 7 |

| Properties | Sag & Run-Off* 10 min. at 400° F. Vertical Panel | Sag & Run-Off* 10 min. at 400° F. Z Bent Panel | Flow Characteristics During Application |
|---|---|---|---|
| Run 1 | None | None | Good |
| Run 2 | None | None | Good |
| Run 3 | None | None | Poor-Fair |
| Run 4 | Slight | None | Fair |
| Run 5 | None | None | Good |
| Run 6 | Excessive | Excessive | Good |

*Caulk bead was ¼" × ¼" × 5" on 3" × 9" × 20" G4 cold rolled steel

The hot-melt sealant and caulking compositions comprising a blend of at least one modified polyethylene resin, at least one filler, an amorphous polyolefin and a thixotropic additive, provide compositions having a unique combination of properties including good flow characteristics under mixing and application conditions, good adhesion to various metals, good corrosion resistance, and resistance to flow or sagging at elevated temperatures after application.

The invention has been described in detail with particular reference to certain preferred embodiments thereof, but it will be understood that variations and modifications can be effected within the spirit and scope of the invention.

We claim:

1. A sealant and caulking composition capable of being used as a hot melt composition comprising a blend of
   (a) about 3 to 12 percent by weight of at least one modified polyethylene,
   (b) about 45 to 70 percent by weight of at least one filler having a particle size of less than 20 microns,
   (c) about 15 to 35 percent by weight of an amorphous polyolefin, and
   (d) about 1 to 4 percent by weight of a thixotropic additive.

2. A sealant and caulking composition according to claim 1 wherein said modified polyethylene has a saponification number of about 3 to 10.

3. A sealant and caulking composition according to claim 2 wherein said filler is $CaCO_3$.

4. A sealant and caulking composition according to claim 3 wherein said amorphous polyolefin is amorphous polypropylene.

5. A sealant and caulking composition capable of being used as a hot melt composition comprising a blend of
   (a) about 5 to 10 weight percent of at least one modified polyethylene,
   (b) about 60 to 70 weight percent of at least one filler having a particle size of less than 20 microns,
   (c) about 20 to 25 weight percent of an amorphous polyolefin, and
   (d) about 1 to 2 percent by weight of a thixotropic additive.

6. A sealant and caulking composition according to claim 5 wherein said modified polyethylene has a saponification number of about 3 to 10.

7. A sealant and caulking composition according to claim 6 wherein said filler is $CaCO_3$.

8. A sealant and caulking composition according to claim 7 wherein said amorphous polyolefin is amorphous polypropylene.

* * * * *